Dec. 20, 1960  W. D. KING ET AL  2,965,821
MOTOR CONTROL APPARATUS

Filed March 28, 1957  2 Sheets-Sheet 1

WITNESSES:
Bernard R. Giegueny
Leon J. Taga

INVENTORS
William D. King and
Billy W. Roberts.
BY R. S. Brodahl
ATTORNEY

Dec. 20, 1960   W. D. KING ET AL   2,965,821
MOTOR CONTROL APPARATUS
Filed March 28, 1957   2 Sheets-Sheet 2

United States Patent Office 2,965,821
Patented Dec. 20, 1960

2,965,821

MOTOR CONTROL APPARATUS

William D. King, Aurora Township, Erie County, and Billy W. Roberts, Buffalo, N.Y., assignors to Westinghouse Electric Corporation, East Pittsburgh, Pa., a corporation of Pennsylvania Filed Mar. 28, 1957, Ser. No. 649,118

16 Claims. (Cl. 318—7)

The present invention relates in general to motor control apparatus, and more particularly to motor control apparatus for a strip tension control device including a plurality of tension controlling members driven by separate motors wherein the load assumed by each of these respective motors in the operation of said strip tension control device is divided or balanced between the motors as may be desired.

In the operation of particularly steel strip rolling mills, it may be desirable that back and front tensions be applied to the strip as it enters and leaves the working rolls. The delivery tension device may have a double armature motor driving an upper roll and a single armature motor driving a lower roll. These three armatures may be duplicated and interchangeable and of the same rating, and further may be commonly powered in parallel from a single direct-current generator power supply. Since the motor diameters may be held to a minimum due to space limitations, there may be a minimum amount of field space sufficient only for the main shunt fields but not sufficient for additional fields for load balancing purposes. Therefore, in accordance with the present invention it may be desirable that the load balancing control be done directly on the main shunt fields of the motors.

In this regard regulating equipment should be provided to obtain the required accuracy of the division of load between the motor armatures, and further, it may be necessary that the ratio of total load in the upper roll motor or motors relative to the total load in the lower roll motor or motors be adjustable. The upper and lower rolls are mechanically tied together by the strip itself, and therefore the three motor armatures may be considered as being rigidly and mechanically tied together.

It is an object of the present invention to provide improved electrical motor control apparatus, and particularly such apparatus for a strip tension controlling device.

It is another object of the present invention to provide improved control apparatus for the driving motors of a strip tension control device, wherein the load assumed by said motors is balanced as between them.

It is a further object of the present invention to provide improved control apparatus for a strip tension controlling device, where a plurality of strip tension control members or rollers are each driven by a separate motor and it is desired that the loads assumed by the respective motors be balanced or controlled as may be desired.

It is a different object of the present invention to provide improved control apparatus for the driving motors of a strip tension device wherein the load distribution between the motors may be controlled as desired.

It is an additional object of the present invention to provide improved load regulating or control apparatus for the plurality of motors driving a steel mill strip tensioning device, wherein an accurate division of the load may be obtained as desired and the ratio of the load assumed by any particular motor as compared to the load assumed by any other one or more of the motors may be adjusted or controlled as desired.

It is still another object of the present invention to provide improved load regulating or control apparatus for a steel mill strip tension or like device having upper and lower cooperating roll members, each driven by a separate motor, and wherein the respective loads assumed by the motors are balanced and/or adjusted and distributed as may be desired.

These and other objects and advantages of the present invention will become apparent in view of the following description taken in conjunction with the drawings, wherein.

Figure 1:
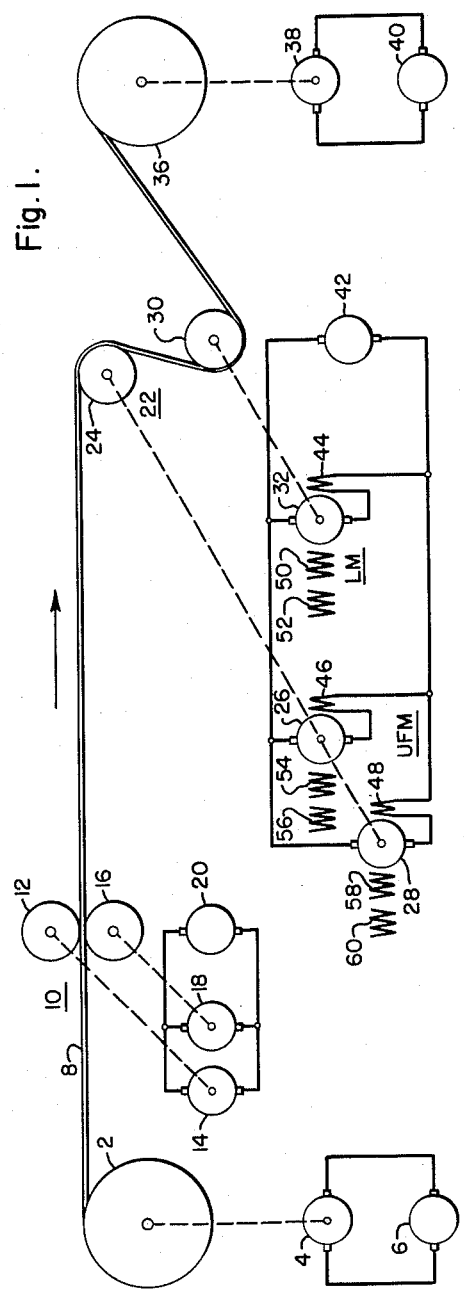
Figure 1 is a diagrammatic showing of steel strip rolling mill apparatus including a strip tensioning device in accordance with the present invention.

In Fig. 1 there is shown an unwind reel 2 powered by a motor 4 operative with a power supply generator 6 for controlling the unwinding or supply of a strip of material 8 to a subsequent mill stand 10. The upper roller 12 of the mill stand 10 is powered by a suitable motor 14 and the lower roller 16 of the mill stand 10 is powered by a suitable motor 18. Each of the latter motors 14 and 18 is supplied power by a generator 20. A strip tensioning device 22 is provided including an upper roller 24 powered by an upper front motor 26 and an upper back motor 28. Each of the latter said upper front motor 26 and upper back motor 28 is connected on a common shaft to the upper roller 24. The lower roller 30 of the tensioning device 22 is controlled by a lower motor 32. Each of the upper front motor 26, the upper back motor 28 and the lower motor 32 is supplied power by a generator 42. A suitable winding reel 36 for the strip 8 is provided and is powered by a motor 38 and a power supply generator 40.

Figure 2:
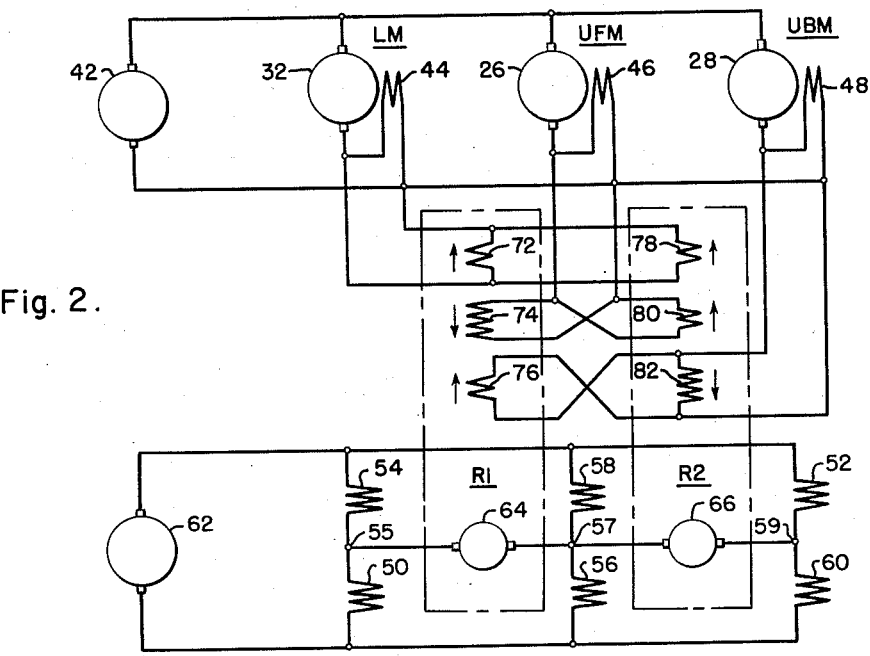
Fig. 2 is a schematic showing of the motor control apparatus for the strip tensioning device in accordance with the present invention.

In Fig. 2 there is shown a generator 42 which may have a rating in the order of 250 volts, 600 kilowatts and 2400 ampere output, connected to supply energy to the parallel connected armature circuits of the upper front motor 26, the upper back motor 28 and the lower motor 32. In series with the armature of the lower motor 32, there is provided a compensating winding 44 which is operative to improve the armature operation and improve the commutation of the lower motor 32. There is similarly provided a compensating winding 46 for the upper front motor 26, and a compensating winding 48 for the upper back motor 28. The shunt field winding for the lower motor 32 is broken into two parts, with respectively a first part 50 and a second part 52. The shunt field winding for the upper front motor 26 is divided into respectively a first part 54 and a second part 56. Similarly, the shunt field winding for the upper back motor 28 is divided into a first part 58 and a second part 60.

The thusly divided shunt field windings for respectively the upper front motor 26, the upper back motor 28 and the lower motor 32 are connected in the series parallel circuit arrangement shown in Fig. 2, with the upper front motor winding portion 54 being connected in series with the lower motor winding portion 50 through the circuit junction 55. The upper back motor winding portion 58 is connected in series with the upper front motor winding portion 56 through the circuit junction 57. The lower motor field winding portion 52 is connected in series with the upper back motor field winding portion 60 through the circuit junction 59. These respective serially connected winding portions are connected in parallel as shown and supplied energy from a suitable generator 62. A first current regulating device 64, which is illustrated to be of the rotating armature type known in the industry as a Rototrol, is connected between the circuit junction 55 between the upper front motor field winding section 54 and the lower motor field winding section 50, and the circuit junction 57 between the upper back motor winding section 58 and the upper front motor winding section 56. A second current regulating device 66, which may be of a similar type, is connected between the latter circuit junction 57 and the circuit junction 59 between the lower motor winding section 52 and the upper back motor winding section 60. A suitable motor operative from a power source and being of a substantially constant speed type of motor may be operatively connected to drive the first and second current regulating devices 64 and 66 shown in Fig. 2. The first current regulating device 64 is provided with a first control winding 72, a second control winding 74 and a third control winding 76. The second current regulating device 66 is provided with a first control winding 78, a second control winding 80 and a third control winding 82.

The polarity of the generator 42 is such that the current flow is in the direction indicated by the arrows through the respective motor armatures. The first control windings 72 and 78 of the respective first and second current regulating devices 64 and 66 are connected to be responsive to the current flow through the compensating winding 44 of the lower motor 32 armature circuit, such that the voltage drop across the compensating winding 44 is proportional to the motor armature current and hence the load assumed by the lower motor 32. The polarity of the first and second control windings 72 and 78 is respectively arranged such that the current flow through these respective windings is in the direction indicated by the arrow above these windings. The second control windings 74 and 80 of the respective first current regulating device 64 and the second current regulating device 66 are connected across the compensating winding 46 of the upper front motor 26, as shown in Fig. 2, with the polarity arrangement of the respective windings being such that the current flow through said windings is in the direction indicated by the arrows. The third control windings 76 and 82 respectively of the first and second current regulating devices 64 and 66 are connected across the compensating winding 48 of the upper back motor 28, with the polarities of these respective windings being arranged such that the current flow through the windings is in the direction indicated by the arrows shown in Fig. 2. In this regard, the first and third windings 72 and 76 of the first current regulating device 64 oppose the second control winding 74, and the first and second control windings 78 and 80 of the second current regulating device 66 oppose the action of the third control winding 82.

In the actual practice of the teachings of the present invention, it may be desirable to provide one-half the number of turns on the respective windings 72 and 76 of the first current regulating device as compared to the second control winding 74, and similarly to provide one-half the number of windings for the first and second control windings 78 and 80 of the second current regulating device 76 as compared to the third control winding 82. In this regard, if some other one of the control windings of either one or both of the first and second current regulating devices 64 and 66 is desired to be poled opposing the others of the control windings, the so opposing control winding for the particular regulator involved should be provided with a number of windings approximately equal to the total number of windings of the others of the control windings for the same regulator.

Figure 3:
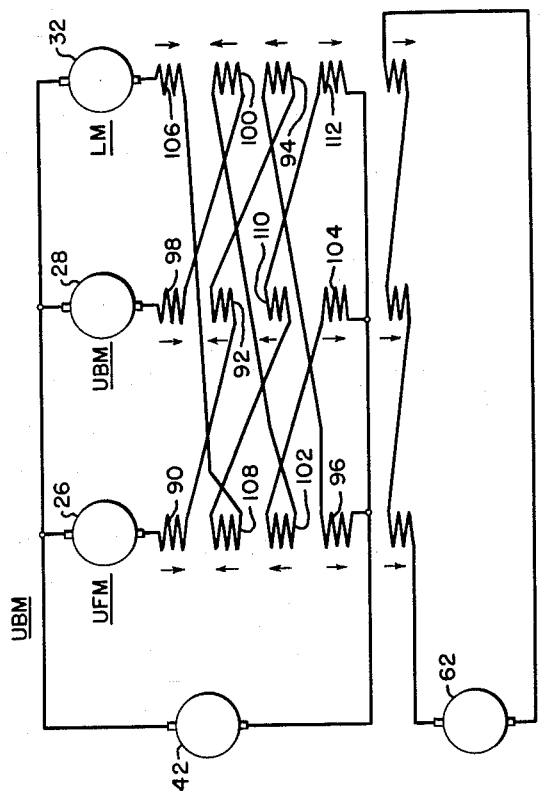
Fig. 3 is a schematic showing of a modification of the motor control apparatus for the strip tensioning device.

In Fig. 3 there is shown a modification of the motor load controlling apparatus in accordance with the present invention wherein the shunt fields of the upper front motor 26, the upper back motor 28 and the lower motor 32 are respectively connected in series across the power supply generator 62, and the series field windings for the respective motors are connected in the armature circuits of the respective motors and arranged as shown in Fig. 3. More specifically, the series field winding for the upper front motor 26 is divided into a first part 90, a second part 92, a third part 94 and a fourth part 96. Similarly, the series field winding for the upper back motor 28 is divided into a first part 98, a second part 100, a third part 102 and a fourth part 104. Similarly, the series field winding for the lower motor 32 is divided into a first section 106, a second section 108, a third section 110 and a fourth section 112. The respective armature circuits for each of the motors, and including the series connected series field winding are parallel connected across the output of the supply generator 42. Each of the series field winding portions shown in Fig. 3 has substantially the same number of turns. Relative to the upper front motor 26, the first and fourth winding portions 90 and 96 respectively are cumulative and oppose the second winding portion 108 of the lower motor 32 and the third winding portion 102 of the upper back motor 28. Similarly, relative to the upper back motor 28, the first and fourth series field portions 98 and 104 are cumulative and oppose the second field winding portion 92 of the upper front motor 26 and the third field winding portion 110 of the lower motor 32. Similarly and relative to the lower motor 32, the first and fourth series field sections 106 and 112 are cumulative and oppose the second field winding portion 100 of the upper back motor 28 and the third field winding portion 94 of the upper front motor 26.

Figure 4:
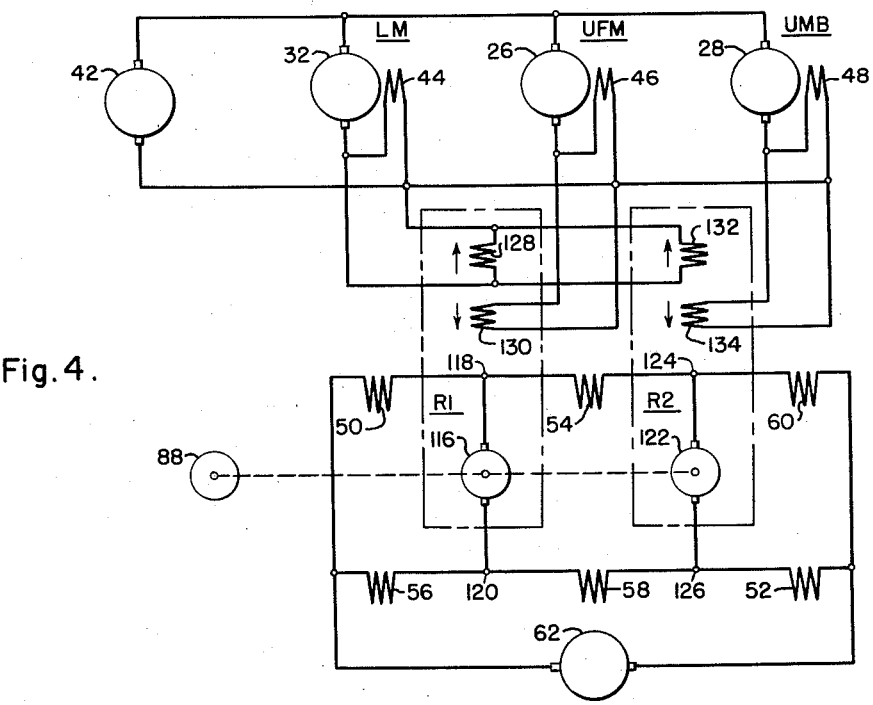
Fig. 4 is a schematic showing of a still further modification of the motor control for the strip tensioning device in accordance with the present invention.

As shown in Fig. 4 there is a still further modification of the motor control apparatus in accordance with the present invention, wherein the supply generator 42 is operative with the lower motor 32 armature circuit and the compensating winding 44 connected in parallel to the upper front motor 26 armature circuit and the compensating winding 46 and the upper back motor 28 armature circuit including the compensating winding 48. In Fig. 4 a first series circuit is provided including a first shunt field winding section 50 of the lower motor 32 which is connected in series through a circuit junction 118 with a first portion 54 of the shunt field winding of the upper front motor and then through a circuit junction 124 to a first portion 60 of the shunt field winding of the upper back motor 28. A second series circuit is provided including the second portion 56 of the shunt field winding of the upper front motor 26 connected through circuit junction 120 to the second portion 58 of the shunt field winding of the upper back motor 28 and then through a circuit junction 126 to the second portion 52 of the shunt field winding of the lower motor 32. The first and second series circuits are connected in parallel across the supply generator 62.

A first current regulating device 116 is connected, as shown, between the circuit junction 118 and the circuit junction 120. A second current regulating device 122 is connected between the circuit junction 124 and the circuit junction 126. The first current regulating device 116 includes a first control winding 128 and a second control winding 130, with said first control winding 128 being responsive to the armature current through the lower motor 32 armature circuit and being poled such that the current flow through the winding 128 is in the direction shown by the arrow. The second control winding 130 is connected across the compensating winding 46 of the upper front motor 26 such that the current flow through the second control winding 130 is in the direction shown by the arrow. The second current regulating device 122 includes a first control winding 132 connected 32 such that the current flow through the first control winding 132 is in the direction shown by the arrow. A second control winding 134 is provided for the second current regulating device 122 and is connected across the compensating winding 48 of the upper back motor 28 armature circuit such that the current flow through the second control winding 134 is in the direction shown by the arrow.

In the operation of the apparatus shown in Fig. 1, the output of the generator 42 has a substantially constant total current such that the tension of the strip being removed from the mill stand 10 is maintained substantially constant by the strip tensioning device 22. The generator 20 is not regulated such that the power supplied to the mill stand 10 is varied as required by the loading of the mill stand 10. The output current of the generator 6 is maintained substantially constant in that the unwind reel 2 is employed to provide the desired tension in the section of the strip 8 between the unwind reel 2 and the mill stand 10. In actual practice, the motor 4 is usually operative as a drag device and feeds electrical energy to the generator 6. Further in the operation of the apparatus shown in Fig. 1, it may be desirable to vary the loading between the motors 26 and 28 for the upper roller 24 of the tensioning device 22 as compared to the lower motor 32 for the lower roller 30 by a variance of up to four to one between said upper roller 24 and the lower roller 30, with either the upper roller 24 taking the greater load as compared to the lower roller 30 or the lower roller 30 taking the greater load as compared to the upper roller 24. Also it may be desirable to provide equal loading or a predetermined load balance between the upper roll 24 and the lower roll 30, or some adjustable loading therebetween.

Referring to Fig. 2, any tendency for the lower motor 32, for purpose of example, to assume more load than desired as compared to the upper front motor 26 and the upper back motor 28 results in an increase in the armature current through the lower motor 32 and therefore through the compensating winding 44. This increases the energization of the first control winding 72 of the first current regulating device 64 and the first control winding 78 of the second current regulating device 66, such that the first current regulating device 64 provides an output voltage of a suitable polarity to decrease the potential of the junction 55 and increase the potential of the junction 57. The second current regulating device 66 for this same condition of operation of the lower motor 32 provides an output voltage to decrease the potential of the junction 57 and increase the potential of the junction 59. With the three motors equally loaded, the second control winding 74 of the first current regulating device 64 effectively balanced the first control winding 72 in combination with the third control winding 76. However, the above-described increased energization of the first control winding 72 created an unbalanced situation such that the first current regulating device 64 was caused to have the above polarity output voltage to decrease the potential of the junction 55 and increase the potential of the junction 57.

Similarly, prior to the unbalanced condition between the loading of the respective motors, the first control winding 78 in combination with the second control winding 80 of the second current regulating device 66 effectively balanced the third control winding 82. However, with the lower motor 32 tending to assume a greater load to thereby increase its armature current, the first control winding 78 of the second current regulating device 66 created an unbalanced condition such that the second current regulating device 66 was provided with the above-described output voltage of a polarity such that the junction 57 was at a decreased potential and the junction 59 was at an increased potential. This results in the upper front motor winding section 54 having an increased current and the lower motor winding portion 50 having a decreased current whereas the upper back motor winding portion 58 is caused to have a decreased current by the action of the first current regulating device 64 and is caused to have an increased current by the action of second current regulating device 66. Similarly, the upper front motor winding portion 56 is caused to have an increased current by the action of the first current regulating device 64 and a decreased current by the action of the second current regulating device 66. The lower motor winding portion 52 is caused to have a decreased current by the action of the second current regulating device 66 and the upper back motor winding portion 60 is caused to have an increased current by the action of the second current regulating device 66. Therefore, it will be seen that the lower motor winding portion 50 and the lower motor field winding portion 52 are both caused to have a decreased current, whereas the upper front motor winding portion 54 and the upper back motor winding portion 60 are both caused to have an increased current, such that the desired load balance is restored through the action of the control apparatus as shown in Fig. 2.

Relative to the apparatus shown in Fig. 3, any tendency for one of the motors, for example the upper front motor 26, to assume more of the load results in an increase in its armature current to thereby increase its own series field energization due to the action of the first and fourth series field winding portions 90 and 96, and to decrease the series field energization of the upper back motor 28 due to the action of the second winding portion 92 and to decrease the series field energization of the lower motor 32 due to the action of the third field winding portion 94. Since all of the motors are operating at substantially the same speed due to the mechanical connection and operation of the strip between the upper roller and the lower roller of the tensioning device and since the upper front motor 26 and the upper back motor 28 are on a common shaft, this results in an increase in the counter electromotive force of the upper front motor 26, and a decrease in the counter electromotive force of the upper back motor 28 and the lower motor 32, to cause the latter two motors to assume more of the load. The control arrangement provides substantially the same torque loading with the proportion being determined by the illustrated control arrangement.

The operation of the control apparatus as shown in Fig. 4 is such that the first current regulating device 116 and the second current regulating device 122 are provided with output voltages of a first polarity or a second and opposite polarity as determined by the energization or the armature current of the respective motors for the strip tensioning device. For example, if the lower motor 32 assumes more of the load of the strip tensioning device than is desired, the armature current through the lower motor 32 will increase and therefore the current through the compensating winding 44 will also increase. This results in an increased energization of the first control winding 128 of the first current regulating device 116 and an increased energization of the first control winding 132 of the second current regulating device 122. The increased energization of the first control winding 128 results in the first control device 116 being provided with an output potential such that the junction 118 is made more positive and the junction 120 is made more negative. Similarly, the increased energization of the first control winding 132 results in the second current regulating device 122 being provided with an output potential which makes the junction 124 more positive and the junction 126 more negative. This effectively decreases the current flow through the lower motor field winding portion 50 and the lower motor winding portion 52, and increases the current flow through the upper back motor winding portion 60 and the upper front motor winding portion 56. This causes the upper front motor 26 and the upper back motor 28 to assume more of the load and restore the desired load balance between the respective motors for the strip tension device.

It should be understood that the current regulating devices as provided in Figs. 2 and 4 may be of the magnetic amplifier type, if desired, and further, it should be understood that the current regulating devices may have no more than 100 volt output voltage for a maximum transient value and a steady-state output voltage value in the order of 5 to 10 volts.

Relative to the apparatus shown in Fig. 3, the total output current of the generator 42 may be in the order of 2400 amperes, with the individual armature currents of the respective motors being in the order of 800 amperes each, such that the series field winding portions may each be required to carry a current in the order of or even greater than 800 amperes. The desired control of the individual motors may be such that the shunt field winding for each motor will provide in the order of 800 ampere turns, whereas each portion of the series field winding may provide in the order of 2000 ampere turns. This means that relative to the upper front motor 26 the 2000 ampere turns of the first winding portion 90 and the 2000 ampere turns of the fourth winding portion 96 are effectively balanced by the opposing 2000 ampere turns of the second winding portion 108 of the lower motor 32 and the 2000 ampere turns of the third winding portion 102 of the upper back motor 28. The same is true for each of the other motors 28 and 30.

Relative to the control apparatus shown in Fig. 4, the first current regulating device 116 is excited by any difference in load between the upper front motor 26 and the lower motor 32, whereas the second current regulating device 112 is excited by any difference in load between the lower motor 32 and the upper back motor 28. Therefore, should the load on the upper front motor 26 become too high then the first current regulating device 116 would be excited in a manner to increase the excitation in each of the two halves of the upper front motor field winding portion 56 and the upper front motor field winding portion 54 and decrease the excitation in each of the lower motor field winding 50 and the upper back motor field winding 58. In this arrangement, the load assumed by the upper front motor 26 would be decreased and the load of each of the lower motor 32 and the upper back motor 28 would be slightly increased to bring the load of the three armatures back in balance. In a similar manner, the same operation occurs to provide the desired load balance should the load of either of the lower motor 32 or the upper back motor 28 become out of balance.

Although the present invention has been described with a certain degree of particularity, it should be understood that the present disclosure has been made only by way of example and that numerous changes in the details of construction and the combination and arrangement of parts may be resorted to without departing from the scope and the spirit of the present invention. For example, the teachings of the present invention should be understood as being applicable for load balancing between any three armatures operating in parallel, either three motor armatures or three generator armatures. Additionally a three armature motor, such as might be used on high speed reel drives or tandem mill roll drives, may be controlled by the subject control apparatus.

We claim as our invention:

1. In control apparatus for a plurality of load members, the combination of a first motor connected to a first of said load members for controlling the operation of said first load member, a second motor connected to a second of said load members for controlling the operation of said second load member, a third motor connected to one of said first and second load members for controlling the operation of said one of the load members, each of said motors having a control winding, a first current regulating device operative with the respective control windings of said first and second motors for controlling the current flow through the latter said control windings, a second current regulating device operative with the respective control windings of said second and third motors for controlling the current flow through the latter said windings, with said first current regulating device being responsive to the loading of at least two of said motors, and with the second current regulating device being responsive to the loading of at least two of said motors.

2. In a control system for a plurality of load members, the combination of a first motor operatively connected to one of said load members, a second motor operatively connected to another of said members, each of said first and second motors having respectively first and second field windings, with the first field winding of the first motor being connected through a first conductor to the first field winding of the second motor and with the second field winding of the first motor being connected through a second conductor to the second field winding of the second motor, a current regulating device connected between said first and second conductors, said current regulating device including a first control winding connected to be responsive to the current flow through said first motor and a second control winding connected to be responsive to the current flow through said second motor.

3. In a control system for a strip tension device including a pair of roll members operative with the strip, the combination of first and second motors operatively connected to one of said roll members for controlling the operation of said one roll member, a third motor operatively connected to the other of said roll members for controlling the operation of said other roll member, with each of said first, second and third motors having respectively first and second field windings, a first current regulating device operative with a first field winding of each of said motors, and a second current regulating device operative with the second field winding of each of said motors, with said first current regulating device having a control winding responsive to the load current of at least two of said motors, and with said second current regulating device having a control winding responsive to the load current of at least two of said motors.

4. In a control system for a strip tension device including a pair of roll members operative with the strip, the combination of first and second motors operatively connected to one of said roll members for controlling the operation of said one roll member, a third motor operatively connected to the other of said roll members for controlling the operation of said other roll member, with each of said first, second and third motors having respectively first and second field windings, with the first field winding of said first motor being connected through a first conductor to the first field winding of said third motor, with the second control field winding of said first motor being connected through a second conductor to the first control field winding of said second motor, and with the second field winding of said second motor being connected through a third conductor to the second field winding of said third motor, a first current regulating device operatively connected between said first and second conductors, and a second current regulating device operatively connected between said second and third conductors.

5. The control system of claim 4, with said first and second current regulating devices being respectively responsive to the loading of at least a predetermined one of said motors for controlling the operation of said roll members in accordance with the loading of said motors.

6. In a control system for a strip tension device including a pair of roll members operative with the strip, the combination of first and second motors operatively connected to one of said roll members for controlling the operation of said one roll member, a third motor operatively connected to the other of said roll members for controlling the operation of said other roll member, with each of said first, second and third motors having respectively a pair of field windings, a first current regulating device operative with at least one field winding of each of said motors, and a second current regulating device operative with at least the other field winding of each of said motors, with said first current regulating device including at least a first pair of control windings and having each control winding responsive to the load current of a different one of said motors and being arranged such that the control winding responsive to the load current of a predetermined one of said motors opposes the other of the latter said control windings, and with said second current regulating device having at least a second pair of control windings and having each control winding responsive to the load current of a different one of said motors and being arranged such that the control winding responsive to the load current of a predetermined one of said motors opposes the other of the latter said control windings.

7. The control system of claim 6, with at least one control winding of the first current regulating device being responsive to a different one of said motors as compared to at least one control winding of the second current regulator device.

8. In control apparatus operative with a strip of material and including a strip tension controlling device having a plurality of strip tension control members, the combination of a first motor operatively connected to one of said members for controlling the tension of said strip, a second motor operatively connected to another of said members for controlling the tension of said strip, each of said first and second motors having respectively first and second field windings, with the first field winding of the first motor being connected through a first conductor to the first field winding of the second motor, and with the second field winding of the first motor being connected through a second conductor to the second field winding of the second motor, a current regulating device connected between said first and second conductors, with said current regulating device being responsive to the loading of each of said respective motors for controlling the operation of said strip tension control members in accordance with the loading of said respective motors.

9. The control system of claim 2, with said first control winding of the current regulating device being opposed to the second control winding of said current regulating device.

10. In control apparatus for a strip tensioning device including a plurality of strip tension control members, the combination of a first motor connected to one of said members for controlling the strip tension, a second motor connected to one of said members for controlling the strip tension, and a third motor connected to one of said members for controlling the strip tension, each of said motors having a field winding, a first current regulating device operative with the field windings of said first and second motors for controlling the current flow through the latter said field windings, a second current regulating device operative with the field windings of said second and third motors for controlling the current flow through the latter said field windings, with said first current regulating device having a plurality of control windings and with each of the latter said control windings being responsive to the loading of a different one of said motors and being arranged such that the control winding responsive to loading of a predetermined one of said motors opposes the other of the latter said control windings, and with said second current regulating device having a plurality of control windings and with each of the latter said control windings being responsive to the loading of a different one of said motors and being arranged such that the control winding responsive to the loading of a predetermined one of said motors opposes the other of the latter said control windings.

11. The control apparatus of claim 10, with said control winding of the first current regulating device responsive to the loading of a predetermined one of said motors being responsive to a different one of said motors as compared to said control winding of the second current regulating device responsive to the loading of a predetermined one of said motors.

12. In control apparatus for a strip tensioning device including a plurality of strip tension control members, the combination of a first motor connected to one of said members for controlling the strip tension, a second motor connected to one of said members for controlling the strip tension, a third motor connected to one of said members for controlling the strip tension, with each of said motors having respectively a field winding and an armature circuit, a first current regulating device including a plurality of control windings and being operative with said field winding of each of the first and second motors for controlling the current flow through the latter said field windings, a second current regulating device including a plurality of control windings and being operative with the field winding of each of said second and third motors for controlling the current flow through the latter said field windings, a plurality of armature current responsive devices connected respectively to the armature circuits of said motors, with a first control winding of each of said first and second current regulating devices being operatively connected to a first of said armature current responsive devices, a second control winding of each of said first and second current regulating devices being operatively connected to a second of said armature current responsive devices, and with a third control winding of each of said first and second current regulating devices being operatively connected to a third of said armature current responsive devices.

13. The control apparatus of claim 12, with said first control winding of each of said first and second current regulating devices being arranged to oppose the second and third control windings of each of said first and second current regulating devices.

14. The control apparatus of claim 12, with said first control winding of said first current regulating device being arranged to oppose the second and third control windings of said first current regulating device, and with said second control winding of said second current regulating device being arranged to oppose the first and third control windings of said second current regulating device.

15. The control system of claim 6, with the control winding of each of said first and second current regulating devices that opposes the other control windings having a greater number of turns than said other control windings.

16. The control system of claim 6, with the control winding of each of said first and second current regulating devices that opposes the other control windings having substantially twice the number of turns as compared to said other control windings.

References Cited in the file of this patent

UNITED STATES PATENTS

| | | |
|---|---|---|
| 2,454,166 | Harding | Nov. 16, 1948 |
| 2,530,972 | Kenyon | Nov. 21, 1950 |
| 2,697,807 | Pell | Dec. 21, 1954 |
| 2,715,702 | Winchester | Aug. 16, 1955 |